(12) United States Patent
Beach

(10) Patent No.: US 6,901,270 B1
(45) Date of Patent: May 31, 2005

(54) APPARATUS AND METHOD FOR WIRELESS COMMUNICATION

(75) Inventor: Robert Beach, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 514 days.

(21) Appl. No.: 09/715,926

(22) Filed: Nov. 17, 2000

(51) Int. Cl.[7] .............................................. G10L 15/00
(52) U.S. Cl. ...................... 455/563; 455/564; 704/270; 704/275; 704/246
(58) Field of Search ............................. 455/564, 563; 704/270, 275, 246, 243, 251

(56) References Cited

U.S. PATENT DOCUMENTS 6,185,535 B1 * 2/2001 Hedin et al. .............. 704/270
6,263,216 B1 * 7/2001 Seydoux .................... 455/564
6,526,381 B1 * 2/2003 Wilson ...................... 704/251
6,584,327 B1 * 6/2003 Nilsson ..................... 455/563

* cited by examiner

Primary Examiner—Nick Corsaro
Assistant Examiner—Alan T. Gantt
(74) Attorney, Agent, or Firm—Baker Botts LLP (57) ABSTRACT

A mobile device is arranged to receive first voice commands to be interpreted by a digital signal processor in said device having a limited vocabulary voice recognition program and to receive second voice commands which are converted to voice representative data signals to be sent by a WLAN to a remote computer for interpretation using a large vocabulary voice recognition program. The mobile device provides voice control of the remote computer and can also provide voice activated voice communications.

17 Claims, 4 Drawing Sheets

APPARATUS AND METHOD FOR WIRELESS COMMUNICATION

BACKGROUND OF THE INVENTION

The present invention relates to wireless communication systems and particularly to systems which use wireless data communication. Existing systems for wireless local area network (WLAN) data communications include systems made according to IEEE Standard 802.11 wherein mobile units associate with an access point connected to a computer or a wired computer network in order to engage in wireless data communications. The assignee of the present invention provides one such system under the tradename Spectrum 24®. Another standard for shorter range wireless data communications, for example between a computer and peripherals is the Bluetooth Standard, which is available at www.bluetooth.com.

It is an object of the invention to provide improved methods and apparatus for wireless communications.

SUMMARY OF THE INVENTION

According to the invention there is provided a mobile unit or device which has a simplified and versatile construction. The device can be used to implement voice control of the mobile device as well as voice control of a remote computer in communication with the device. The mobile device can be combined with one or more additional units, such as a computer or a bar-code scanner, and function as a data processing and communications module for providing wireless data communications.

In accordance with one aspect the invention there is provided a method for operating a system by voice command comprising providing a mobile unit having a microphone, a digital signal processor and a radio module for providing wireless data communications to a computer. First voice commands having a limited vocabulary are received in the mobile unit and recognized using the digital signal processor of the mobile unit. The mobile unit is controlled in response to the first voice commands. Second voice commands are received in the mobile unit and converted to digital data signals which are sent using the radio module to a computer. The computer is operated to recognized the second voice command using a large vocabulary voice recognition program to derive computer control signals therefrom.

In a preferred arrangement of the method, the mobile unit is controlled in response to the first voice commands to communicate with the computer. The computer can be operated in response to the computer control signals derived from the second voice command. In one arrangement the second voice commands may be used to derive computer control signals which retrieve data from a memory of computer. The retrieved data can be converted into voice data and sent the mobile unit, where the voice data is converted to analog signals which are supplied to a speaker. In another alternate arrangement, the computer control signals are arranged to establish a voice communication channel between the mobile unit and at least one other voice communication device. The computer is operated to establish the voice communication channel to transfer voice communication data between the mobile unit and the other voice communication device. Establishing the voice communication channel may include converting the voice communication data between digital and analog form.

According to another aspect of the invention there is provided a mobile device which includes a microphone for receiving sound signals, an interface connected to the microphone for converting received sound signals from the microphone to data signals and a radio module for sending wireless data communication signals. A digital signal processor is provided which includes a program for recognizing a limited number of digital data signals from the interface and operating in response thereto to control the radio, for operating the radio module to send digital data signals and for providing digital data signals corresponding to sounds from the microphone as data packets to the radio module.

In one arrangement the digital processor may be programmed to compress the digital data signals corresponding to sounds. The mobile device may include a speaker and the interface can be arranged for converting digital data signals representing sound signals and providing the sound signals to the speaker. The digital signal processor is further programmed to provide digital data signals received by the radio module to the interface for conversion to sound signals. Preferably the digital processor is programmed to compress the digital data signals representing sound signals from the microphone and to decompress digital data signals received by the radio. The mobile device may optionally have an interface whereby the digital processor is connected to a host processor such that data signals can be sent or received by the host processor using the radio module. The digital processor may optionally be interfaced to a bar code scanner for receiving bar code signals from the scanner and for converting the bar code signals to digital data signals. In a preferred arrangement the digital processor is programmed to receive data signals from the interface and to alternately supply the data signals to first and second buffer memories during alternating first and second time intervals using direct memory access. The processor is further programmed to process data in one of the data buffers while data signals are supplied to the other of the data buffers. The processing preferably includes use of a data compression algorithm and may additionally include voice echo cancellation processing.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
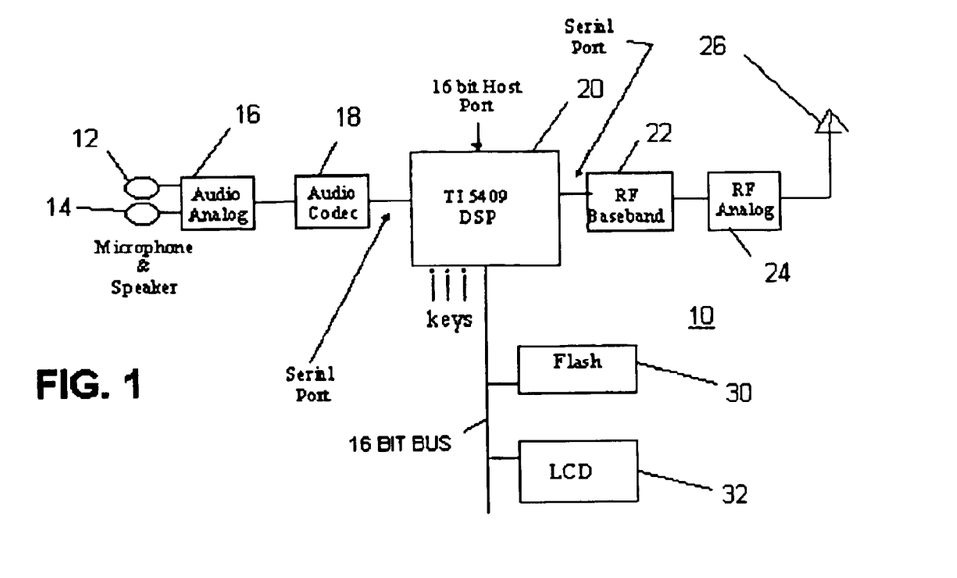
FIG. 1 is a block diagram of an embodiment of a mobile device in accordance with the present invention.

Referring to FIG. 1 there is shown a block diagram of a mobile device 10 in accordance with an embodiment of the present invention. The device 1 includes a microphone 12 and a speaker or earphone 14 which are coupled respectively to provide and receive audio analog signals to and from analog processor 16. An audio Codex 18 is provided for respectively converting audio signals from microphone 12 into digital data signals corresponding thereto, and for converting digital data signals representing sounds into analog signals to be provided to speaker 14. Codex 18 is interfaced to a first serial port of a processor 20, which in a preferred arrangement is a Texas Instrument 5409 digital signal processor (DSP). Those skilled in the art will recognized that other processors may be used for purposes of carrying out the invention, but the 5409 DSP is considered to have particular advantages in connection with its speed of operation, modest power consumption and other capabilities, including its ability to interface with other devices via serial ports and a data bus, as will be described. A second serial port of processor 20 is interfaced to RF baseband processor 22 which is coupled to RF analog section 24. Processor 22 and analog circuit 24 provide in a preferred embodiment for the transmission and reception of digital data signals following the 802.11 protocol. Signals are sent and received by antenna 26. The mobile device 10 and the method of the present invention can be applied to other wireless data communications protocols, such as Bluetooth, the device, method and system will be described in connection with an 802.11 system. Those familiar with the art can reconfigure the device and method for compatibility with other systems.

In one arrangement the mobile device 10 of FIG. 1 may be provided as a hand held "communicator" device which is capable of providing limited on board speech recognition for purposes of controlling device 10, and for communicating by digital data signals with a remote computer for purposes of providing voice commands to the remote computer. In this arrangement, it becomes possible for a person using mobile device 10 to establish a connection to the computer over an 802.11 local area network using first limited vocabulary voice commands. Once a connection is established, the user can give instructions to the computer for performing tasks by transmission of second voice commands from mobile device 10 to the computer, through an access point connected to the remote computer. For example, a user could instruct device 10 to access the computer by a command of a single word or short phrase, such as "computer on". The device 10 would recognize the first voice command "computer on" and be prepared to transfer the following second voice commands from the user to the computer. The digital processor of mobile unit 10 may, for example, place the device in active mode and provide an output voice signal to indicate the command has been understood, such as "Ready".

The user may then give a further second command for the computer, such as "inventory". In response to the command "inventory" the mobile device 10 would convert the command to a digital data signal and send the command to the computer using the radio module. The computer would perform a recognition on the word "inventory" using a large vocabulary voice recognition system and realize that the user of mobile device 10 wanted information from an inventory maintained in the computer system.

The computer then might generate a data signal representing a response to the term "inventory" such as "what part number?". This data signal would be sent to mobile device 10 over the wireless local area network and be provided to the speaker 14. Responding to the computer's request for a part number, the user could give a sequence of numbers by voice, which is again relayed to the computer, provided to the large vocabulary voice recognition system, and cause the computer to look up the part number in an inventory database and retrieve information concerning the availability of that part in the storeroom and its location. Again this information can then be converted to voice data format and sent to mobile device 10 as digitally encoded voice signals, which are provided by the receiver to speaker 14.

Figure 2:
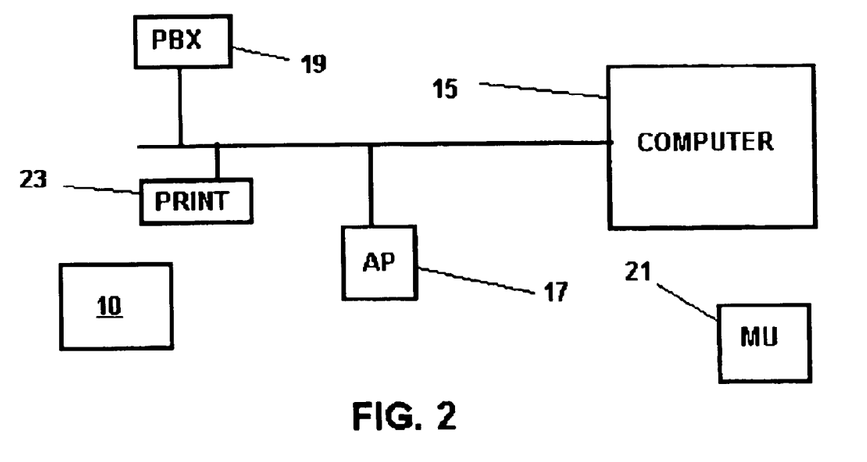
FIG. 2 is a block diagram showing the use of the mobile device of FIG. 1 in a wireless network.

FIG. 2 shows an example of a system arrangement in which the mobile device 10 of the present invention can be used. As shown in FIG. 2 there is provided a computer 15, which may be a server system, for example, running on a UNIX or other operating system capable of supporting a large vocabulary voice recognition system. Computer 15 is connected to access point 17 which conducts wireless communication with mobile device 10, using 802.11 protocol or other wireless protocol. Computer 15 may also be connected to other peripheral devices, such as a digital PBX 19 or a printer 23. Another mobile unit 21 may also be provided for conducting 802.11 or other wireless communication with computer 15 through access point 10 or other access points. Alternatively, mobile unit 21 can provide wireless communication through access point 17 with mobile device 10. In one environment mobile device 10 is a highly simplified device which may include only one or a very small number of keys for operation thereof. In one embodiment, for example, only an on/off key may be provided. In other configurations, more than one key may be provided for certain functions such as volume up/down or to cause the device to "wake up" from a power saving mode. It is intended that for some applications the device 10 is primarily operated by voice command, and that the voice commands be interpreted in the device itself, for a very limited vocabulary of commands, or in computer 15 for a larger vocabulary of commands. Mobile device 10 can be used to control the operation of computer 15 by voice command, or alternatively, may be used for communications, such as telephone communication or walkie-talkie type communications with one or more other mobile units 21, which may be similar to mobile device 10, or with other telephone devices through PBX 19.

It should be recognized that the second voice commands which are subject to interpretation in computer 15 may be interpreted as control instructions for operation of computer 15 and its peripheral devices, such as printer 23, but can additionally be used to provide control signals which are sent back to processor 20 in mobile device 10 as operational instructions. For example, a user may give the command "volume up" or "volume down". Such instructions can be interpreted with the limited vocabulary of programming in processor 10, or may be sent as voice representative data signals to be interpreted in computer 15. In the later case computer 15, having recognized the instruction creates a corresponding data message which is sent as a control signal over the wireless network to be implemented by processor 20 in mobile device 10.

In a preferred arrangement, mobile device 10 carries on a method whereby the unit itself and/or computer 15 may be controlled using voice commands. According to a preferred arrangement of the invention mobile device 10 is provided with programming in DSP 20 that recognizes one or a very small number of voice commands provided to microphone 12 by the user. Additional commands are provided by digital communication of voice data from mobile device 10 to access point 17 and thereafter to computer 15 which has a larger vocabulary voice recognition system.

The mobile device 10 can be used as a stand alone unit as described above for providing voice command and voice communications function. In addition the mobile device 10 can be configured as a part of a larger portable device, operating as a communication module.

Figure 3:
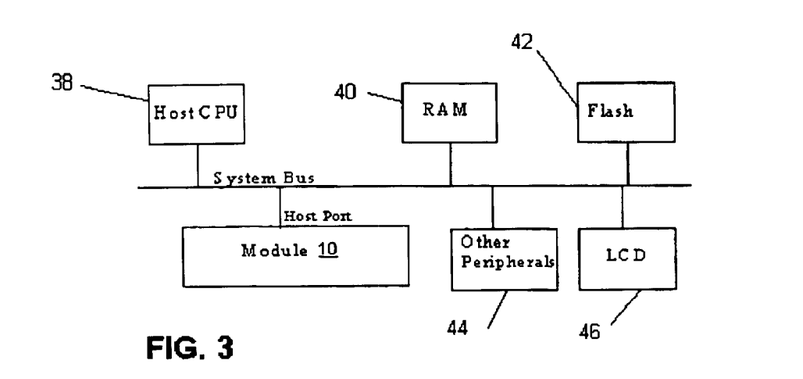
FIG. 3 is a block diagram showing the connection of the FIG. 1 mobile device to a host computer.

One example of the application of mobile device 10 is shown in FIG. 3, wherein the device is interfaced via the host part of the DSP20 to the system bus of a portable computer, point of sale device or digital personnel assistant device. The configuration of FIG. 3 includes a host CPU38, RAM40, flash memory 42, display 46 and possibly other peripherals 44 such as a barcode scanner. In the FIG. 3 configuration the mobile device 10 provides the addition function of providing wireless data communication capability to host CPU 38 so that the operator can send and receive data over the WLAN from and to the CPU 38, which may, for example be displayed for the user on display 46.

Figure 5:
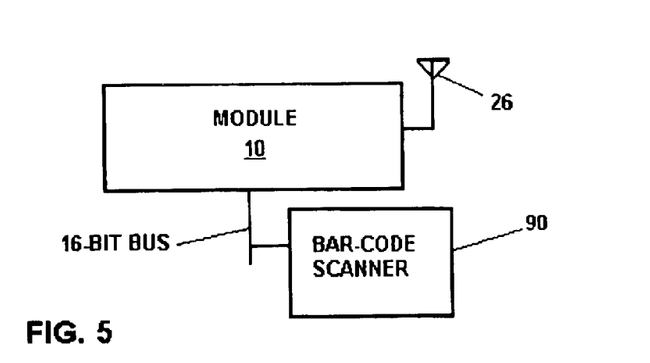
FIG. 5 is a block diagram showing the connection of the FIG. 1 mobile device to a bar code scanner.

Another example of application of mobile device 10 is shown in FIG. 5, wherein the mobile unit is interfaced to bar-code scanner 90 to provide processing and wireless communication of bar code signals from scanner 90. Thus when a user of the portable device scans a bar code, the code signals can be processed in DSP20 and sent as data signals to a host processor. In the FIG. 5 configuration the bar code scanner 90 is interfaced to the 16 bit bus of DSP20.

A significant application of mobile device 10 in either a stand alone configuration or when combined with other devices is to provide voice communication functions. In a first operating mode, telephone communications can be provided, preferably by providing a PBX 19 connected to the wired network which includes computer 15 and access point 17, as shown in FIG. 2. PBX 19 includes an interface to provide conversion of voice representative digital signals into voice signals and vice versa. In addition, the interface may provide conversion of digital address signals into DTMF signals for operating PBX 19 to access a telephone extension or external number. The address signals may be provided to the PBX interface by computer 15 in response to voice commands received from mobile device 10 via access point 17.

In connection with telephone service mobile device 10 operates to send and receive voice representative data packets which are converted into voice signals, and vice versa, and may operate in full duplex mode. In one embodiment a user may establish a telephone connection as follows:

User: "Computer On"
Response: "Computer Ready"
User: "Telephone"
Response: "Who do you want to call?"
User: "John Cook"
Response: "Calling John Cook"

At this point Computer 15 retrieves the telephone or extension number for John Cook and sends a message to the interface of PBX 19 which establishes the call and converts voice-data packets to voice signals for the telephone communication.

To end the telephone call the user may invoke the assistance of computer by commanding "Computer on", which is recognized by DSP20 to establish a voice link to Computer 15. This may be followed by a user-voice command, such as "End call" or "Hang Up" which is received and executed by Computer 15. Alternatively, where the local voice recognition program is not operating during a telephone call, the device may be provided with a command button that places the device in voice recognition mode, or that interrupts the telephone communication to send voice commands to Computer 15. Depressing the button cause mobile device 10 to send the voice message to the recognition routine of computer 15 rather than send the voice message as part of a telephone conversation.

In the case where a command button is provided, it may be used to bring device 10 out of a power saving mode and into a voice command mode. In this embodiment the voice recognition software in mobile device 10 does not need to be constantly running.

It should be recognized that a call can also be placed by giving a telephone or extension number by voice command.

In addition to regular telephone-connection via PBX 19, the mobile device may also be used to establish telephone like voice communications to other mobile units 21 in the system which have the same or similar voice communications arrangement. For example in response to "Who do you want to call?" a user may respond "Manager". Computer 15 would then establish a voice connection to mobile unit 21, which is carried by the manager on duty. This voice connection is established, for example by computer 15 sending out data messages to mobile device 10 giving the IP address of the Manager's mobile unit 21, and also sending a data message to mobile unit 21, signaling the incoming call from mobile device 10 and possibly also sending the IP address of mobile device 10. The latter can also be supplied by a message from mobile device 10. Communication of voice representative data between mobile device 10 and mobile unit 21 can proceed via the network for example through access point 17 or via the wired network to a different access point serving mobile unit 21.

It will be recognized that Computer 15 can likewise set up "conference calls" among mobile units, telephone extensions, outside telephone numbers and mobile devices, preferably using voice command and PBX19 and AP17. Further, units can be linked in a walkie-talkie mode, wherein only half duplex communication is provided. Further, a user of mobile unit 10 may command the computer to connect the unit for a broadcast to all or a group of voice capable mobile units, for example members of a security force, or to connect the mobile device to a loudspeaker system for a public announcement.

The mobile device 10 of the invention may additionally be used in voice applications that do not involve voice communications. For example, mobile device 10 may be used as an interactive guide device, for example in a museum or on a self guided tour. The user may indicate to a computer 15 a location or a work of art that is being viewed and receive a description concerning the subject. The description can be in any selected available language, and in variable detail. For example, a tourist may only want basic information about a work of art, while a student may want more detailed information. This may be provided when the user responds "yes" in response to a prompt "Do you want more information?" The information is stored in computer 15, either in digital voice format or in alphanumeric format which is provided to a voice generating program.

Another application of mobile device 10 is to provide voice readout of e-mail messages. The user of mobile device 10 can access an e-mail account. Newly received e-mails can be provided to a voice synthesizer that "reads" the received messages upon request.

Another application of mobile device 10 is to provide music or other playback from digital recordings stored in the memory of computer 15, for example under MP3 format. The user of mobile device 10 can select one or more recordings to listen to by voice command.

Figure 4:
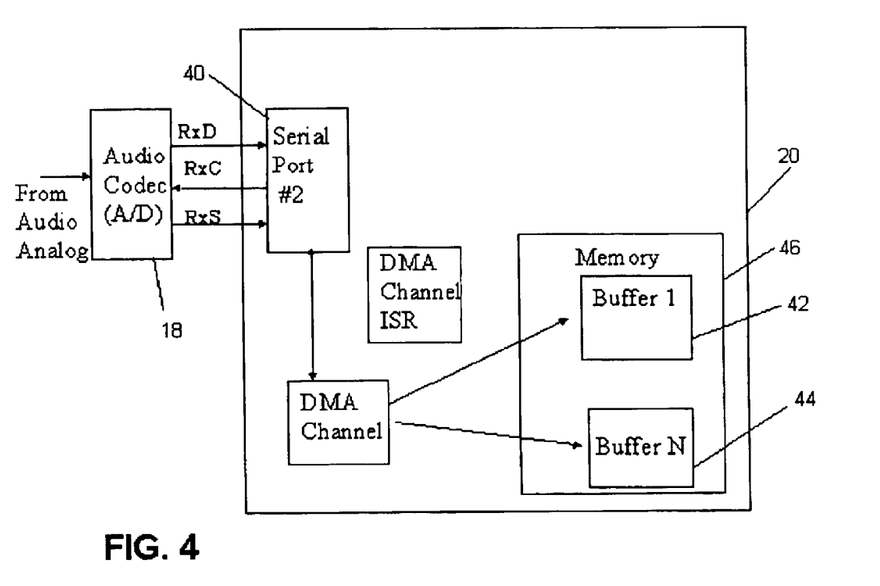
FIG. 4 is a block diagram illustrating the operation of the digital processor of the FIG. 1 device in connection with converting sound signals into compressed data signals.

FIG. 4 is a block diagram showing the interface of digital processor 20 to audio Codex 18. Audio Codex 18 is connected to serial port 40 of digital signal processor 20. The programing of digital signal processor 20 is arranged to cause data provided at serial port 40 via a DMA memory access to a first, second and possibly more buffer memories 42, 44 within the memory 46 of digital signal processor 20. In particular an analog audio signal is converted into a digital signal, for example, a 14 or 16 bit signal, in audio Codex 18 and clocked through serial port 40 through a DMA channel into a first buffer 42 in memory 46 of digital signal processor 20. The sampling rate may be, for example, 64 K bits/sec and may be varied to obtain higher or lower quality audio sampling. For example, a lower sampling rate may be used for voice communications, such as telephone-like communications, on a higher sampling rate may be used for voice input, such as the first or second commands, that must be recognized by a voice recognition program. The samples are provided to buffer 42 which has a capacity to hold 10 ms worth of samples. When buffer 42 is filled the Interrupt Service Routine (ISR) causes the DMA channel to automatically switch to a second buffer 44 and continuing to provide the voice data to buffer 44 while the digital signal processor processes the data in buffer 42. Voice processing will typically take 1 ms to perform 729 compression and perhaps another millisecond for other activities, such as echo cancellation and packetization of the digital audio signal. After the second buffer 44 is filled the voice data is provided to the first buffer 42 while the data in buffer 44 is processed by the digital signal processor.

Figure 7:
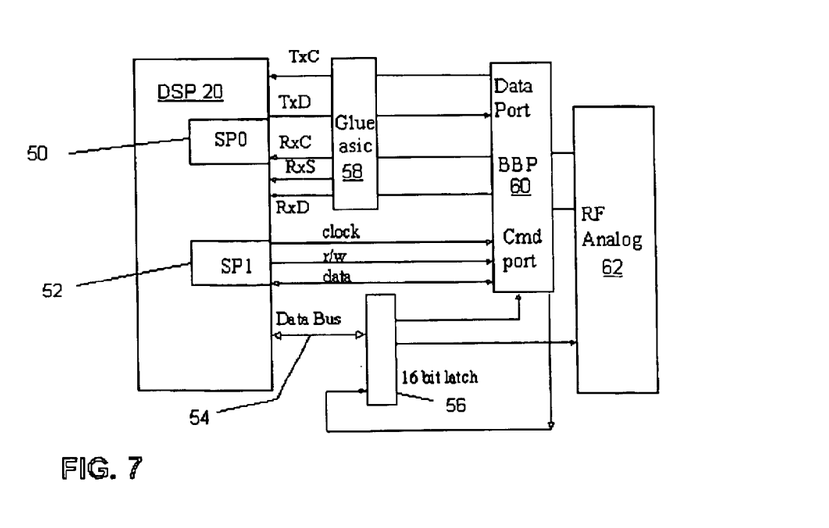
FIG. 7 is a block diagram showing the interface of the digital processor of the FIG. 1 device to the RF portions of the device.

FIG. 7 shows the interface of the digital signal processor 20 to the radio frequency portions of the mobile device 10 for transmission of a voice or data pocket. Serial port 50 of digital signal processor 20 is connected for data transfer through ASIC 58 which is connected to the base band processor 60 of the radio portion of the device. Base band processor 60 is likewise connected to RF analog section 62. The base band processor may, for example be an Intersil 3861 unit. The RF analog section may be the same as those used in current Spectum 24 products. A second serial interface 52 of digital signal processor 20 is connected to provide signals from the digital signal processor to the command port of the base band processor 60. In addition control and status signals are provided between DSP 20 and BBP 60 on data bus 54 and written to 16 bit latch 56 for providing signals to the command ports of base band processor 60 and analog circuit 62 in connection with the transmission and reception of data packets by mobile device 10.

Figure 8:
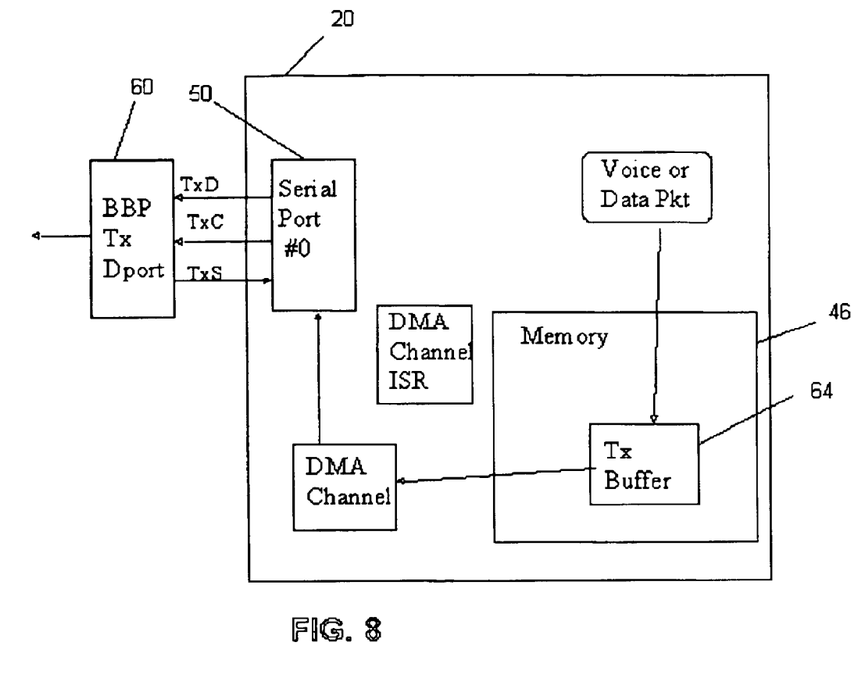
FIG. 8 is a block diagram showing the operation of the processor of the FIG. 1 device in connection with RF transmission of data packets.

Referring to FIG. 8 the a voice representative data packet pocket or data packet to be transmitted is stored in transmit buffer 64 in memory 46 of DSP 20. The data packet may be either a data signal or a signal consisting of digitized, and preferably compressed, voice data. DSP 20 is programmed to provide a DMA channel to serial port 50 under control of the ISR by which the data to be transmitted is clocked into base band processor 60. Prior to the transfer of the data packet, the header and other overhead data are added to the data packet by processor 20. The CRC of the 802.11 signal format may be provided in ASIC 58 wherein the CRC data is computed and added to the data packet as it is provided to base band processor 60.

Figure 6:
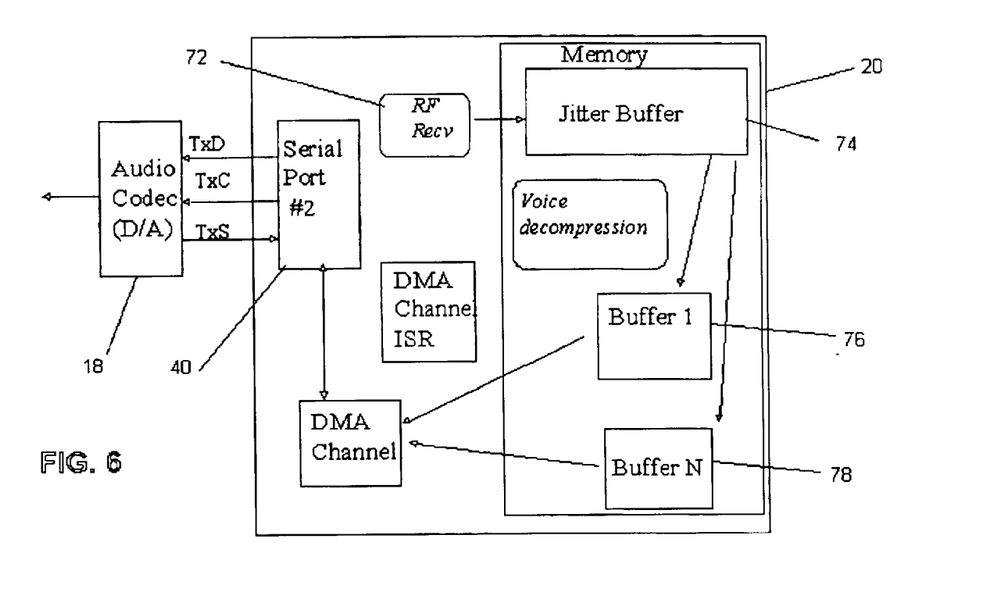
FIG. 6 is a block diagram showing the operation of the processor of the FIG. 1 device in connection with processing received voice signals.
Figure 9:
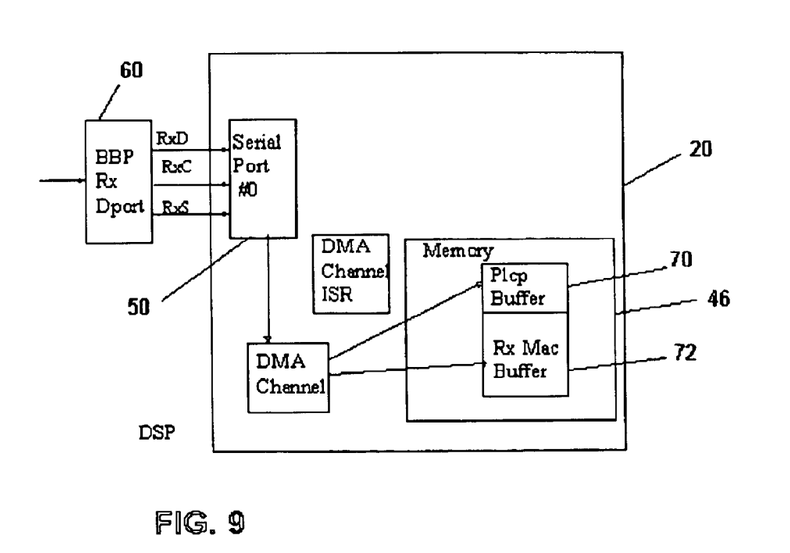
FIG. 9 is a block diagram showing the operation of the digital processor of the FIG. 1 device in connection with the reception of data packets.

FIG. 9 is a block diagram illustrating the operation of digital signal processor 20 in connection with receiving a data packet from the RF module, which may be either data or voice encoded data. The received signal packet is provided to serial port 50 from base band processor 60 and provided by DMA access to a buffer under control of the ISR, having a first buffer portion 70 for receiving the PLCP header portion of the 802.11 packet, for example, and a second buffer portion 72 for receiving the remainder of the packet. Referring to FIG. 6 the received data packet, if it consists of encoded voice signals is provided from buffer 72 to jitter buffer 74 which compensates for the irregularities in time during which the voice signal sample is received over the wireless local area network. The digital signal processor 20 performs voice decompression and places the decompressed sound digital signals into two or more buffers such as buffer 76 and buffer 78 which are read out to serial port 40 in alternating sequence under ISR control, and provided to Codex 18 for the generation of audio signals to be provided to speaker 14.

In a preferred embodiment of the mobile device 10 two very real time processes, RF and voice, share the same CPU without interfering with one another. A key to understanding how this is done is understanding that the two processes are actually quite complementary and so share the processor with only a few minor accommodations.

The voice process consists of two basic activities: one very lightweight and very real time, and the other rather heavyweight but only very moderately real time. The first activity has already been described, and consists of managing the DMA channel, Serial Port and buffers that transfer voice data to/and from the audio Codex. The transfer rate and amount of data is relatively low and moves at a constant rate. Every 10 ms enough data has moved between the DSP and Codex to require processing by the DSP. The actual transfer is handled by DMA and ISR and involves only very quick and simple buffer flips. The actual buffer flipping is handled by the DMA controller and so the ISRs can be a little late since they will be setting up the "next buffer." This is a very common double buffering trick. One might even add a third buffer to give us even more "jitter" time in servicing the DMA interrupts.

The other major voice process is the voice compression and echo cancellation processing. These are the "heavy" routines, especially compression. The G.729 code consumes about 10 MIPs on the average to compress 10 ms of voice samples into a 16 byte voice "cell". Echo cancellation consumes another MIP or two. Given a 100 MIPs processor (such as the T1 5409), this is about 10–15% (10–12 MIPS out of 100) of the CPU capacity. Hence every 10 ms, the CPU must spend 1–2 ms doing compression and echo cancellation. Once started, this processing cannot be halted, although it can be interrupted without much problem. This is an important concept since even 1 ms is a long time for the RF process (one might receive 2–3 packets of data on the RF channel at 11 Mbits/sec in that time). The key timing goal for the voice processing routines is to complete the 1–2 ms of processing before the next 10 ms interval begins. In other words, one must complete processing the last 10 ms of samples before the next 10 ms of samples is completed. One really has 18 ms to complete the 1 ms, but one will then have to do 2 sets of samples in the next 4 ms (and that might be hard depending on what else is going on). One might add a third buffer and so give us 30 ms to complete 6 ms of processing but any more buffers beyond that and one begins to impact latency.

The decompression process utilizes much less CPU resources, perhaps 1–2 MIPS.

The RF processing is in many ways quite different than the voice processing. It consists of two basic activities: a moderately lightweight but very real time process and a moderately lightweight but very loosely realtime process. The first process consists of the actual packet transmit and receive routines. The transmit process is the least real time of the two if one ignores the actual data transfer element (which is handled by the DMA controller and does not utilize any CPU resources except for setup and completion). The process of the building the transmit packet, including Wire Equivalent Privacy (WEP), can be done at the same processing "level" as the voice compression process (i.e. at "task" level rather than at "interrupt" level). For voice packets, it could well be considered part of the voice processing task. The only realtime processing element of the transmit process consists of monitoring the channel waiting for a time to transmit. Once the data starts moving, the CPU is out of the loop until the DMA completes. At that time, the realtime element associated with the transmit process is waiting for an ACK (if required). The ACK will appear within a few dozen microseconds or not at all.

The receive process is more realtime since it interacts more closely with the BBP, which does not include significant intelligence, and is demanding in terms of communication. As noted in earlier sections, the receive process consists of fielding two DMA channel interrupts with a little processing after each. The end of packet processing of receive packets is a very hard real time task since the goodness of the packet must be verified using the CRC data and an ACK readied (if needed) within a slot time of 10–20 µs. The ACK itself is trivial to build and send but it must go out on time.

The other major element of the RF process (for an 802.11 System) is the association/roaming activity. Most of the time this activity takes place on a longer time scale than anything else on the system. The decision to roam and associate with an AP takes place over periods of hundreds of ms to seconds. The actual process of associating is very quick (a 2 packet exchange of very short duration), but the decision to roam and the discovery of other APs is more a background activity than anything else. There are exceptions (like when one cannot find any AP), but such activity clearly takes precedence over all other activities (except keeping the speaker side of the code fed with at least silence).

This section outlines the framework for the software running on the DFC. There is a need for multiple timers in this model. They are needed for a variety of purposes such as:

Collision avoidance backoff and packet retries for the RF Tx process

Loss of packet clocking on RF receive

Roaming and associating timing

There is only a single timer on the T1 5409 DSP and so it may be necessary to either multiplex the times for these purposes, or add additional external timers added. Associated with the timers are ISRs that are involved in changing state of the RE process.

The concept of a simple "main loop" that handles the voice processing routines and the association/roaming process is key to the DFC architecture. It should be noted that in the following discussion, the term "process" is frequently used. In this context, "process" simply means "activity" and not a separate thread of processing such as one might find in a multitasking kernel. This loop is a simple polling loop that responds to event flags and buffer changes created by the DMA channels and their respective ISRs. There are 5 major activities in this loop:

Voice Processing

RF Processing

Data transmission/reception

Configuration and Control

User Interface (optional)

The voice processing element of the loop is very simple:

(1) Wait for a signal from the voice receive ISR that the DMA has filled up a buffer of voice samples. When the signal is found, invoke the voice compression and echo cancellation routines. These will occupy the "main loop" process for 1–2 ms.

(2) Wait for 2 voice cells (20 ms) of voice to become ready and then prepare a RTP/UDP/IP/802.11 header set. If WEP is required, then do so at this point. The header creation is trivial but the WEP requires about 400 ns/byte and so a 100 byte packet would require 40 µs, a minor computational burden. When this is done, start the RF transmit process.

(3) Wait for a signal from the voice ISR that the DMA has emptied a buffer of voice data, and so it is time to take a 16 byte voice cell from the jitter buffer and decompress it into voice samples. This will occupy the voice loop for 200–300 µs.

The RF side of the main loop consists of two elements:

Extracting voice cells from packet

Association and Roaming

The first task is extracting voice cells from received packets and placing them in the jitter buffer. This process involves working through the various headers and getting down to the voice cell. This is a minor parsing and copying process.

The association and roaming process has several states that define its priority relative to the rest of the system. The initial and most important state is "Not associated". In this state the MU is activity looking for an AP. This involves sending probe packets and waiting for replies. For the mobile device 10, this is about the most important activity and when in this state can generally ignore voice processing entirely (making sure that the speaker output is muted). If associated then the association/roaming process operates as a background activity, collecting information on error rates and signal strength as well as looking for other APs. Again this involves generating occasional probe packets and waiting for replies. The computational and network load for this activity is minor.

The Data Transmission and Reception part of the loop deal with the transmission and reception of nonvoice data packets. Even in a voice centric environment there is a certain amount of data transmission and reception. The mobile device 10 must communicate with the voice server in computer 17 to determine how it should operate. In addition, when the mobile device 10 can be used as an RF module in a larger terminal, as shown in FIG. 3, so it must be capable of providing a WLAN data interface to that terminal.

The data transmission process (DTP) involves examining a single buffer to determine if there is anything to send. A host processor 38 or processor 20 process places data in this buffer and waits for it to be sent. The data my be data being communicated by host processor 38, bar code data processed by processor 20 or "overhead" control data messages originated by processor 20, such as association/roaming messages and ACK signals. The request and completion state is indicated by a simple state variable. If the buffer is full, then the applications simply wait for it to become empty. Once a buffer has been filled and recognized by the data transmit process, an 802.11 header will be added to it in space reserved for it at the beginning of the buffer. If WEP is required, then it will be performed at the 400 ns/byte rate.

A 1500 byte buffer would require 600 µs to encrypt. Once this is completed, DTP will call the appropriate routines will be called by DTP to schedule the transmission. If a transmission is already in process, the DTP will exit and check back again later. When the transmission is complete, the buffer will be freed by the RF transmit ISR.

The Data Reception Process (DRP) really begins in the RF reception process mentioned earlier. That process receives all packets from the RF receive ISR and parses them looking for voice cells. If the packet is not a voice cell, then the packet is passed to the DRP. The "passing" may be as simple as marking the buffer for the DRP to look at and ceasing any further processing on it. The DRP will examine it and determine if it some the processor 20 cares about. If not, then it will be passed to the host processor 38, bar-code reader 90 or another peripheral device. If the packet is not for any device associated with mobile device 10, it will be ignored.

The Command and Configuration Process (CCP) is primarily concerned with determining the destination (and source) of voice streams. This involves supplying IP and MAC addresses as well as a code to the voice processing routines. There are a variety of mechanisms to do this. If the mobile device 10 is part of a larger terminal, then it will likely come via a configuration command (or something as simple as writing the data into a well known location). If the mobile device 10 is in communication with a voice server in computer 15, then the information will come over the network via a data packet (the contents of which will be written into those well known locations).

The final element of the main loop is the User Interface Process (UIP). This is really a placeholder for UI code that may be present in mobile device 10. It would involve looking for key presses and acting accordingly. This activity may involve a local activity like changing the volume or a global activity like changing the destination of the voice stream from another voice system to the voice recognition server.

The overall model is very simple. It involves a "task" level polling loop that is essentially a non preemptive scheduler. Activities at this level are started as a result of events at interrupt level. Once started, an activity runs until it finishes or otherwise yields control of the processor. Of the various activities at this level, there is one "big" one which is voice compression. It may run for 1–2 ms at a time. All of the other activities are much shorter term.

The presence of the voice compression code and its long processing time means that the RF packet send/receive process must run almost entirely at interrupt level. This means the main loop code or other routines, such as voice compression, will be frequently interrupted but so long as the main loop gets 20% of the CPU cycles, everything will work fine. The RF interrupt processing will consume far less that 80% of the CPU, even at 100% network utilization.

Most packet transmissions originate at the main loop level (the only exception are the ACKs that are generated in the RF Receive ISR). At that level, the 802.11 packet is created and prepared for transmission. A call is made to a subroutine that will start the transmission process and take "ownership" of the buffer. The actual transmission will start sometime later in an ISR. Likewise the completion action will occur at ISR. The same applies for retransmissions. There are basically two transmit buffers: one for priority things (mostly management frames) and one for non priority things (including voice traffic).

The RF reception process runs entirely at ISR. Packets are received in the two step process mentioned earlier. First the DMA transfers the PLCP header to memory and generates an interrupt. This allows the CPU to parse the header and setup for to transfer the rest of the packet using DMA. There will be 2 or 3 fixed sized packet buffers (different buffers may have different sizes and so we can place the packet in the optimally sized buffer). The receive process stays in the ISR long enough to receive enough of the packet to verify that it is for the client. This will be no more than 100 µs, worst case. Another interrupt will occur when the packet ends at which time the ISR will decide whether to generate at ACK or not. The receive ISR will format and send the ACK, bypassing the RF Transmit ISR entirely. The receive packet buffer is passed to the main loop via an event flag and a buffer pointer.

The main loop parses received packets and determines what to do with them. WEP decryption is done at the main loop level (again at the 400 ns/byte rate). Packets may contain voice cells that go into the jitter buffer, data packets for the processor 20 or user application, or 802.11 management frames for the association/roaming process.

As noted in earlier sections, most of the information presented so far is focused on the "Active Voice Transfer" mode of operation, which is essentially the mobile device 10 acting as a vehicle for full duplex voice conversations. There are other modes of operation and this section will describe those modes and how they work.

A key concept here is that the other modes are generally different software modules that are loaded into the onchip memory of the DSP from external memory. This is because the amount of on chip memory for the 5409 is limited to 64 KB. Execution out of off chip memory is both extremely slow as well as costly from a power consumption basis (executing in off chip memory doubles the power consumption of the DSP). For terminal devices, the external memory will be an external flash memory. For embedded mobile device 10, the source of will be the host process. This process will occur very quickly even for the flash memory case. The transfers will typically go at 20 MB/sec (16 bits every 100 ns from the flash memory) and so 20 KB of code would take only a 1–2 ms. All of the transitions between the various operating modes take place on much larger time frames than a few milliseconds. It is likely that there will be a certain amount of shared data bases and data structures that most, if not all, the modes use. Items like the AP table, voice buffers, ESS and BSS information, etc. are likely to be shared across multiple modes.

The following are some other operating modes for the mobile device 10. There may be other modes that develop over time. Furthermore, simply because a separate mode is identified does not mean that it may not be implemented as a submode within another mode.

Initialization and Diagnostics—This mode is the initial startup state in which the mobile device 10 performs hardware and software initialization. It may also perform some basic poweron diagnostics Local Voice Recognition/RF PSP—This mode is the normal sleep state for the mobile device 10. It is waking up for beacons from the AP and it is looking for certain "magic words" as input using the embedded small vocabulary speech recognition program. A key press may also wake the device up as may the reception of a packet from the network.

NonVoice RF CAM—In this mode, the unit may be actively transmitting data packets but is not processing a voice stream. This mode may be frequently used when the mobile device 10 is inside a terminal product and the terminal is doing data only activities.

Voice/RF PSP—This mode supports an intercom/walkie talkie mode of operation in which an added latency is acceptable because the voice traffic is not full duplex as it would be in a telephone type call.

Remote Voice Recognition/RP CAM—This mode is a variant of the Active Voice Transfer mode in which the goal is to offer the remote voice recognition server the best voice quality possible, even if it consumes additional network resources. The rationale is that the duration of such modes is short and good recognition performance is a key.

The Initialization and Diagnostics is basically the startup mode of the mobile device 10. It runs some basic poweron diagnostics, initializes hardware and software, and then loads the real runtime code.

The Local Voice Recognition mode of the mobile device 10 runs at a greatly very reduced instruction execution rate (1–2 MIPS rather than 100 MIPS) and so power consumption is greatly reduced. It is not likely to be halted entirely since it consumes much less power when simply slowed down. In this mode, it keeps a timer running for waking up the RF section for brief times to receive beacons. The rest of the time the RF section is entirely powered down and the serial ports/DMA channels connected to the BBP are also halted. The other activity in this mode is looking for local wake up signals of which there may be at least two. The first is a key press. The second is a spoken "magic" word. To do this, the mobile device 10 keeps the audio input code/serial port/dma engine running, dumping samples into memory. Every 10 ms or so, a voice recognition routine is invoked to process the received audio samples, looking for the magic word. This process has a very low demand on CPU resources and so the DSP 20 can be slowed down a lot. During this time the output audio system is also shut down since there is nothing to listen to.

The NonVoice RF CAM mode is the active voice transfer mode without any voice processing going on. The entire audio section is shut down including the code, serial ports, and DMA channels. It is conceivable that the DSP may also be slowed down in this state since the only real activity is handling the RF interface.

In the Voice/RF PSP mode of operation the radio is operating in PSP mode but there is an active voice channel. The DSP operates at full rate with the audio section active, but the RF section is generally powered down. It is woken up every 100 ms or so to receive (or send) the next voice packet. The number of voice cells/packet is increased from 2 or 3 to perhaps as many as 10.

The Remote Voice Recognition/RF CAM mode is a variant on the active voice transfer mode in which a higher quality voice sample is sent briefly to the server 17. The improvement is only from the mobile device 10 to the server 17. The server 17 to mobile device 10 voice channel may utilize a more compressed voice channel. It may also be disabled entirely. There are several options for the voice processing required in this mode. The simplest is to simply increase the sampling rate and send the data as 16 bit values. This involves virtually no processing. Another approach is run feature extraction algorithms on the data and sent the processed results to the voice server. In any case both the RF and voice sections are active just like they are in active voice transfer mode.

In a further alternate embodiment illustrated in FIG. 5 a barcode scanner 90 is connected to the 16 bit bus of the DSP 20. There is clearly sufficient CPU cycles available on the DSP 20 to handle the decode process of a one dimensional barcode (there might even be enough for a two dimensional code).

The operation of a bar code decode engine is very similar to voice compression. One gets a sample of digitized analog data on a regular basis and then one processes it looking for interesting patterns. The process repeats until the decode has been completed or the user gives up. On a 100 scans/sec engine, there is a sample of data every 10 ms (just like voice samples).

In such an integrated model, the user would need to make a choice between scanning and talking. When the scanner decode was in process, the speaker would go quiet and no voice data would be accepted by the code. Of course if no voice transfer was in process at the time, then there would be nothing to shutdown. The RF would continue to operate much in the same way as voice processing and RF processing operate.

The biggest issue could well be the code size of the decode software. Trying to run it in the onchip memory of the DSP 20 could well be impossible given the other activities going on. It is possible to add some external SRAM to the DSP into which the decode software could be placed. Executing out of that SRAM would incur a performance penalty and power consumption would increase. On the other hand, even at a reduced performance level the DSP could still run the decode algorithm and the increased power consumption (and cost) would still be less than with a separate decode processor.

While there have been described what are believed to be the preferred embodiments of the invention, those skilled in the art will recognize that other and further modifications may be made thereto without departing from the spirit of the invention, and it is intended to claim all such changes and modifications as fall within the true scope of the invention.

I claim:

1. A method for operating a system by voice command, comprising:

providing a mobile unit having a microphone, a digital signal processor and a radio module for providing wireless data communications to a computer;

receiving first voice commands having a limited vocabulary in said mobile unit, recognizing said first voice commands in said digital signal processor and controlling said mobile unit in response to said first voice commands;

receiving second voice commands in said mobile unit, converting said second voice commands to digital data signals comprising a digital representation of said second voice commands in said mobile unit and sending said digital data signals to said computer using said radio module; and operating said computer to recognize said second voice commands using said digital data signals and a large vocabulary voice recognition program to derive computer control signals therefrom, wherein computer control signals provide instructions for operation of said computer or at least one of its attached peripheral devices.

2. A method as specified in claim 1 wherein said controlling said mobile unit in response to said first voice commands comprises controlling said mobile unit to communicate with said computer.

3. A method as specified in claim 1 further including operating said computer in response to said computer control signals.

4. A method as specified in claim 1 wherein said first voice commands have a fixed limited vocabulary.

5. A mobile device, comprising:
a microphone for receiving sound signals;
an interface, connected to said microphone for converting received sound signals from said microphone to data signals;
a radio module for sending wireless data communication signals; and
a digital signal processor, said processor including a program for (1) recognizing a limited number of digital data signals from said interface and operating in response thereto to control said radio, (2) operating said radio module to send digital data signals, and (3) providing digital data signals corresponding to sounds from said microphone as data packets to said radio module, wherein said digital data signals provide instructions for a remote computer and its peripheral devices.

6. A mobile device as specified in claim 5 wherein said digital processor is further programmed to compress said digital data signals corresponding to sounds.

7. A mobile device as specified in claim 5 wherein said processor includes a program for recognizing a fixed limited number of digital data signals.

8. A method for operating a system by voice command, comprising:
providing a mobile unit having a microphone and a speaker, a digital signal processor and a radio module for providing wireless data communications to a computer;
receiving first voice commands having a limited vocabulary in said mobile unit, recognizing said first voice commands in said digital signal processor and controlling said mobile unit in response to said first voice commands;
receiving second voice commands in said mobile unit, converting said second voice commands to digital data signals in said mobile unit and sending said digital data signals to said computer using said radio module;
operating said computer to recognize said second voice commands using a large vocabulary voice recognition program to derive computer control signals therefrom;
operating said computer or one of its peripheral devices in response to said computer signals;
wherein said operating said computer comprises retrieving data from a memory of said computer, converting said retrieved data into voice data, sending said voice data to said mobile unit; and
converting said voice data to analog signals using said digital signal processor in said mobile unit and supplying said analog signals to said speaker.

9. A method for operating a system by voice command, comprising:
providing a mobile unit having a microphone and a speaker, a digital signal processor and a radio module for providing wireless data communications to a computer;
receiving first voice commands having a limited vocabulary in said mobile unit, recognizing said first voice commands in said digital signal processor and controlling said mobile unit in response to said first voice commands;
receiving second voice commands in said mobile unit, converting said second voice commands to digital data signals in said mobile unit and sending said digital data signals to said computer using said radio module;
operating said computer to recognize said second voice commands using a large vocabulary voice recognition program to derive computer control signals therefrom; and
operating said computer or one of its peripheral devices in response to said computer control signals;
wherein said computer control signals are arranged to establish a voice communications channel between said mobile unit and at least one other voice communicating device, and wherein said computer is operated to establish said voice communications channel to transfer voice communication data between said mobile unit and said other voice communications device.

10. A method as specified in claim 9 wherein establishing said voice communications channel includes converting said voice communications data between digital and analog form.

11. A mobile device, comprising:
a microphone for receiving sound signals;
a speaker;
an interface, connected to said microphone for converting received sound signals from said microphone to data signals and for converting digital data signals into sound signals and providing said sound signals to said speaker;
a radio module for sending wireless data communication signals; and
a digital signal processor, said processor including a program for (1) recognizing a limited number of digital data signals from said interface and operating in response thereto to control said radio, (2) operating said radio module to send digital data signals, (3) providing digital data signals corresponding to sounds from said microphone as data packets to said radio module and (4) providing digital data signals received by said radio to said interface for conversion to sound signals, wherein two-way communication between a remote computer and said radio module utilize said digital data signals.

12. A mobile device as specified in claim 11 wherein said digital processor is further programmed to compress said digital data signals from said interface and to decompress digital data signals received by said radio.

13. A mobile device as specified in claim 12 wherein said digital processor controls said interface to have a first sampling rate for voice signals corresponding to commands and to have a second sampling rate for voice signals corresponding to voice communications.

14. A mobile device as specified in claim 11 wherein said digital processor is interfaced to a host processor for transferring data signals to be sent or received using said radio module.

15. A mobile device as specified in claim 11 wherein said digital processor is interfaced to a bar code scanner for receiving bar code signals from said scanner, and wherein said digital processor is further programmed to convert said bar code signals to digital data signals.

16. A mobile device as specified in claim 11 wherein said digital processor is programmed to receive data signals from said interface and to alternately supply said data signals to first and second buffer memories during alternating first and second time intervals by direct memory access, and wherein said processor is programmed to process data in one of said data buffers while said data signals are supplied to the other of said data buffers.

17. A mobile device as specified in claim 16 wherein said processor is programmed to process said data using a compression algorithm.

* * * * *